United States Patent
Dvorkin

(10) Patent No.: US 6,473,600 B1
(45) Date of Patent: Oct. 29, 2002

(54) MOBILE PHONE WITH INCREASED TRANSMITTER EFFICIENCY EMPLOYING TWO TRANSMIT ANTENNAS

(75) Inventor: Vladimir A. Dvorkin, Castro Valley, CA (US)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/459,627

(22) Filed: Dec. 13, 1999

(51) Int. Cl.[7] .............................. H04B 1/02; H04B 7/02; H04B 1/034
(52) U.S. Cl. ..................... 455/129; 455/91; 455/101; 455/127
(58) Field of Search ................................ 455/101, 104, 455/127, 129, 522, 575, 78, 91

(56) References Cited

U.S. PATENT DOCUMENTS

| | | | | |
|---|---|---|---|---|
| 4,057,758 A | * | 11/1977 | Hattori et al. | 375/267 |
| 5,128,629 A | * | 7/1992 | Trinh | 330/129 |
| 5,613,219 A | * | 3/1997 | Vogel et al. | 342/368 |
| 5,758,269 A | * | 5/1998 | Wu | 455/115 |
| 5,909,643 A | * | 6/1999 | Aihara | 330/51 |
| 6,006,117 A | * | 12/1999 | Hageltorn et al. | 455/129 |
| 6,101,374 A | * | 8/2000 | Kono | 455/101 |
| 6,118,989 A | | 9/2000 | Abe et al. | 455/127 |
| 6,240,279 B1 | * | 5/2001 | Nitta et al. | 455/115 |
| 6,343,208 B1 | * | 1/2002 | Ying | 343/702 |

FOREIGN PATENT DOCUMENTS

| | | | | |
|---|---|---|---|---|
| EP | 0752735 A1 | 1/1997 | | H01Q/1/24 |
| WO | WO9734377 | 9/1997 | | H04B/1/38 |

* cited by examiner

Primary Examiner—Lee Nguyen
Assistant Examiner—Simon Nguyen
(74) Attorney, Agent, or Firm—Jack D. Slobod

(57) ABSTRACT

A transmission portion of a front end for a portable communication device, in accordance with the present invention, includes a first transmission antenna coupled to a first output of a branching device for transmitting signals having a power below a threshold value. A power amplifier is coupled to a second output of the branching device. The power amplifier provides amplification to signals to be transmitted. A second transmission antenna is connected to an output of the power amplifier such that the power amplifier is switched off for transmission signals having a power below the threshold value and switched on to amplify transmission signals above the threshold value.

24 Claims, 3 Drawing Sheets

MOBILE PHONE WITH INCREASED TRANSMITTER EFFICIENCY EMPLOYING TWO TRANSMIT ANTENNAS

BACKGROUND

1. Technical Field

This disclosure relates to mobile communications and more particularly, to a mobile communication device with increased transmitter power efficiency.

2. Description of the Related Art

Portable communications systems typically rely on radio frequency transmissions that are sent and received using antennas. Conventional mobile phones employ a whip antenna for receiver functions and transmitter functions on a shared basis. The receive and transmit circuits are accommodated to provide both the receive and transmit functions through the same antenna.

Referring to FIG. 1, a schematic diagram of a portion of a mobile phone 10 is shown. Mobile phone 10 employs a receiver/transmitter (Rx/Tx) whip antenna 11 with a duplexer or switch 12. Duplexer 12 permits access to both receiver circuitry 14 and transmitter circuitry 16. Receiver circuitry 14 includes a low noise amplifier (LNA) 18 which receives a radio frequency signal. A band pass filter (BPF) 20 filters the signal. A mixer 22 mixes the filtered signal with a signal from a local oscillator 24 to output an intermediate frequency (IF) signal on a line 26. The received signal is processed as is known in the art.

Transmitter (Tx) circuitry 16 includes an inphase/quadrature (I/Q) modulated signal 28 which is mixed by mixer 30 with a signal from local oscillator 24. The mixed signal is amplified by a power amplifier driver 32 and then filtered by a band pass filter (BPF) 34. The filtered signal is then amplified by a power amplifier 36. After being amplified by amplifier 36, the signal is transmitted from antenna 11. Referring to FIG. 2, other prior art designs have employed separate (dedicated) patch antennas 40 and 42 for receiving and transmitting signals, respectively.

These typical antenna arrangements of mobile phones, include a Tx power amplifier 36 which is always ON (OFF in stand-by mode) and is working with a wide range of transmit power levels controlled by the infrastructure of mobile phone networks. Tx power amplifier 36 typically has maximum power efficiency at the maximum Tx power output levels. Correspondingly, operating at lower Tx power levels means low efficiency for the Tx power amplifier.

Proposed suggestions to address the efficiency problem have included implementing switches or linearization techniques. Linearization techniques include employing non-linear amplification which is more power efficient and then applying a linear scheme. Such techniques suffer from high implementation costs for transmission circuitry. Therefore, a need exists for a portable communication device which provides high power efficiency without high costs for transmission circuitry. Less power usage is desirable, which in mobile phone systems, increases talk time, for example.

SUMMARY OF THE INVENTION

A transmission portion of a front end for a portable communication device, in accordance with the present invention, includes a first transmission antenna coupled to a first output of a branching device for transmitting signals having a power below a threshold value. A power amplifier is coupled to a second output of the branching device. The power amplifier provides amplification to signals to be transmitted. A second transmission antenna is connected to an output of the power amplifier such that the power amplifier is switched off for transmission signals having a power below the threshold value and switched on to amplify transmission signals above the threshold value.

A front end for a portable communication device, in accordance with the present invention, includes a transmission portion having a first transmission antenna coupled to a first output of a branching device for transmitting signals having a power below a threshold value, and a power amplifier is coupled to a second output of the branching device. The power amplifier provides amplification to signals to be transmitted, and a second transmission antenna is connected to an output of the power amplifier such that the power amplifier is switched off for transmission signals having a power below the threshold value and switched on to amplify transmission signals above the threshold value. A receiver portion includes a receiver antenna coupled to a receive mixer for receiving signals for the front end. A local oscillator is included for providing signals to down convert the received signals and up convert the transmission signals for the front end.

In alternate embodiments, the first and second antennas may include patch antennas, embedded antennas or other types of antennas. The branching device may include a switch or a splitter. The communication device may include a mobile phone, a two-way pager, a personal digital assistant, or other transmitter device. The mobile phone may include a code division multiple access phone having a transmission power range of about 80 decibels. The power amplifier may provide a gain of 30 decibels and the threshold value is about 30 decibels below a largest transmission value of the transmission power range. The power amplifier may provide a gain G and the threshold value is less than a largest transmission value of the transmission power range minus G. A power sensor may be adapted for sensing a power level of received signals and outputs an enable signal to switch the power amplifier on when the sensed power is below a value, and disables the power amplifier when the sensed power is above the value. The transmission portion may further include a coupler adapted for sensing a power level at an output of the power amplifier for switching the power amplifier off when the sensed power is below a value and enabling the power amplifier when the sensed power is above the value.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention is directed to an apparatus which increases transmit power efficiency for portable communication devices by implementing two or more transmit branches with two or more transmit patch antennas. In one embodiment, the two or more transmit patch antennas are employed into a mobile phone device. Using two transmit antennas affords an opportunity to switch a transmit power amplifier OFF, when the mobile phone transmits at signal levels equal to a maximum output power minus the net gain of the transmit power amplifier, or at lower signal levels. Advantageously, in a preferred embodiment, the two or more transmit branches are based on different power output ranges. This leads to lower power consumption for batteries and longer talk time provided for mobile phones.

Figure 1:
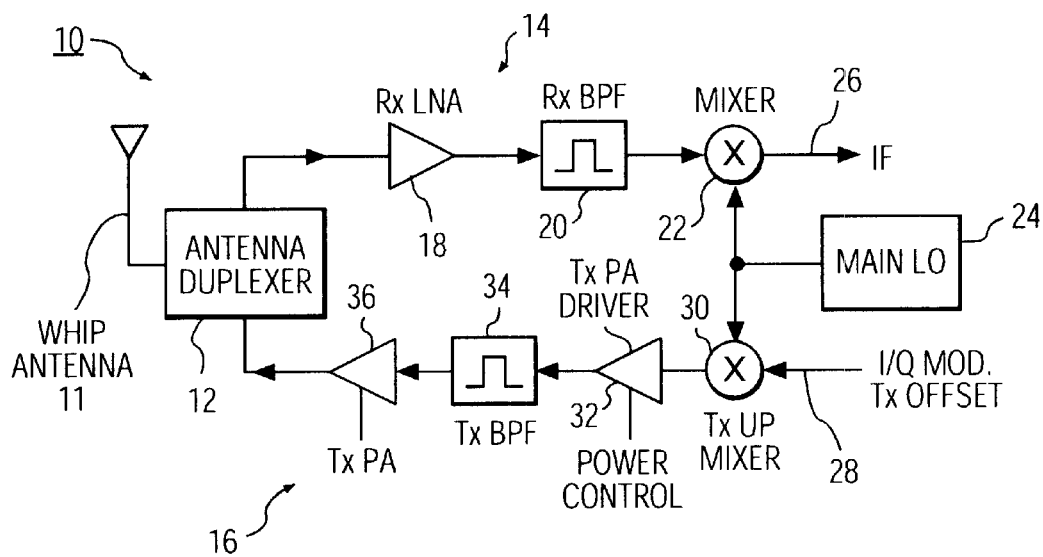
FIG. 1 is a schematic diagram of a conventional mobile phone front end architecture with a whip antenna.
Figure 2:
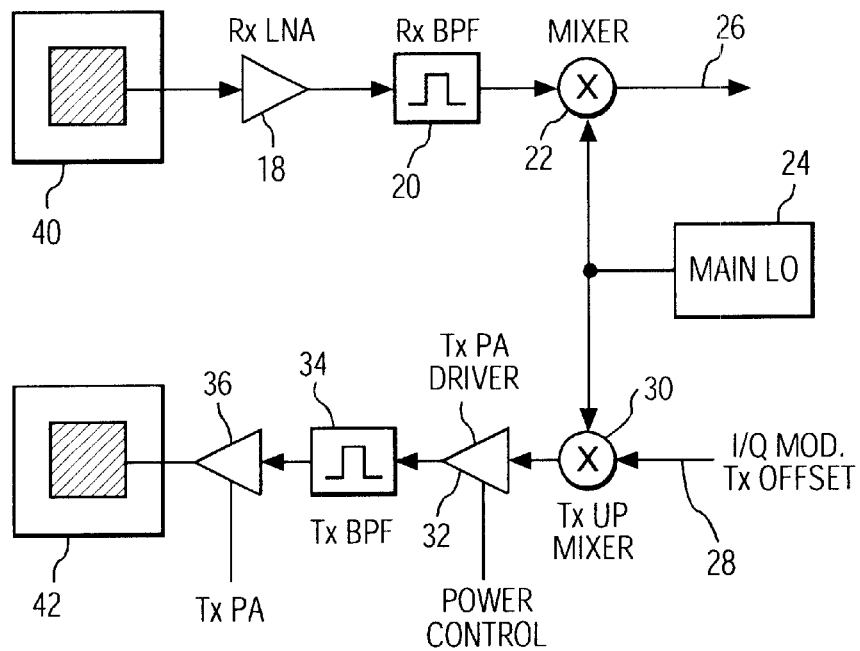
FIG. 2 is a schematic diagram of a conventional mobile phone front end architecture with dedicated receive and transmit patch antennas.
Figure 3:
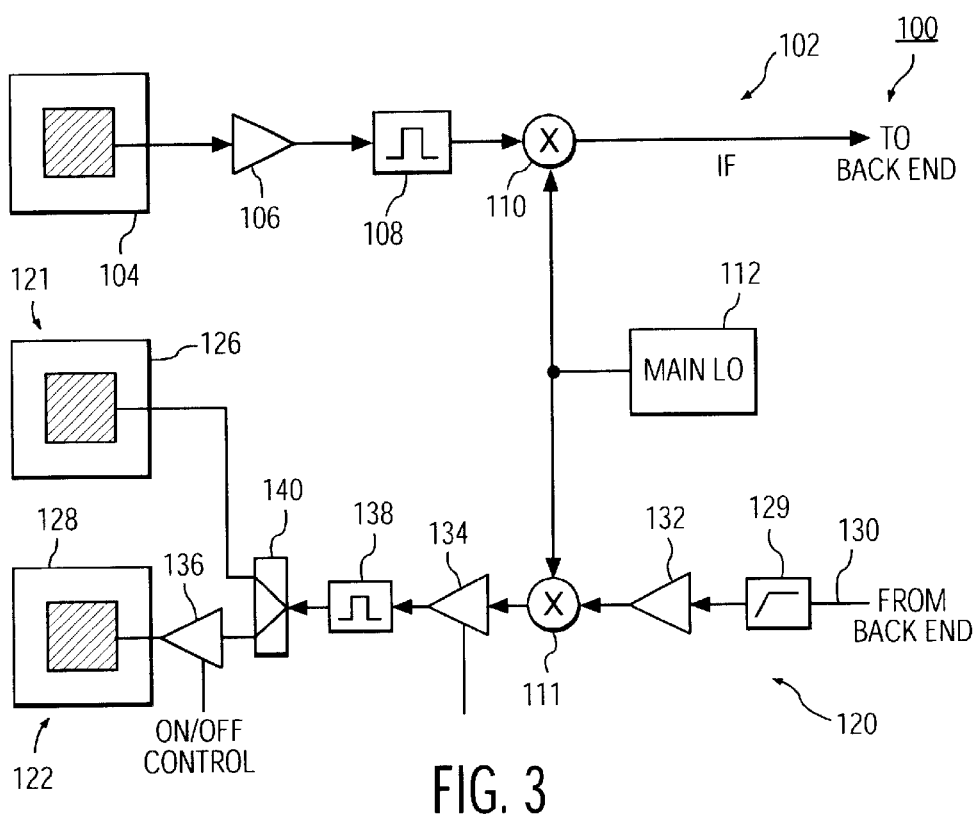
FIG. 3 is a schematic diagram of a front end architecture of a communication device having two transmission patch antennas in accordance with the present invention.

Referring now in specific detail to the drawings in which like reference numerals identify similar or identical elements throughout the several views, and initially to FIG. 3, a portable communication device 100 is shown. Device 100 may include a mobile phone, a wireless modem, a personal digital assistant, a two-way pager or other digital or analog wireless transceiver device. FIG. 3 shows front end architecture of device 100 for transmitting and receiving communication signals form a wireless network or another communications device.

Device 100 includes a receiver portion 102. Receiver portion includes an antenna 104 for receiving signals. Antenna 104 may include a patch antenna, an embedded antenna or any other useful antenna. The received signals may include signals transmitted over a wireless network or directly from other transmission devices. In one embodiment, signals are received by a mobile phone, and the received signals include radio frequency (RF) carrier signals. An amplifier 106 amplifies the received signals. Amplifier 106 preferably includes a low noise amplifier which provides needed amplification of the received signals with less noise.

A band pass filter 108 filters the amplified signal. Band pass filter 108 passes signal bands of interest while rejecting other signals. The output of band pass filter 108 is mixed by a mixer 110 with a signal from a local oscillator 112 to output an intermediate frequency (IF) signal on line 114 to a back end of device 100. Mixer 110 down converts the input signal to output a desired frequency range. Local oscillator 112 is adjustable to supply signals of a desired frequency range (tuning). Line 114 is connected to the infrastructure of device 100 which processes the received signals to derive information or data from the received signal.

A transmit portion 120 of the front end of device 100 includes a line 130 for receiving intermediate frequency IF signals for transmission. In one embodiment, the IF signals are in-phase-quadrature (I/Q) offset. However, other modulation methods may be employed. A filter 129 may be employed to clean up the signals. The IF signal is adjusted by a power controlled or gain controlled amplifier 132 to provide sufficient amplitude to the IF signal for mixing with the signals from local oscillator 112. Mixer 111 up converts the IF signals to RF signals in a given transmit frequency range. The IF signal is mixed with the local oscillator signal to provide correct transmission frequencies. The mixed signals are again adjusted by a variable gain controlled amplifier 134 which may also be referred to as variable power amplifier driver.

Power amplifier driver 134 outputs to a band pass filter 138 which is employed to remove unwanted frequency bands from the radio frequency signal to be transmitted. Transmit portion 120 of the front end of device 100 preferably includes two branches 121 and 122. Advantageously, in accordance with the present invention, device 100 implements two transmit antennas 126 and 128 by splitting the transmitted signal after band pass filter 138. Transmit antennas 126 and 128 may be, for example, a patch antenna, an embedded antenna, or other useful antenna types. Each branch 121 or 122 services a portion of the available transmission power range. In a particularly useful embodiment, the power range is split between branches 121 and 122 such that patch antenna 126 is always ON and serves the lower power range for transmission power. Consequently, antenna 128 may be turned OFF and may be turned on when the higher portion of the transmission power range is employed.

Antennas 126 and 128 are split by a splitter or switched by a switch indicated by block 140. In one embodiment, switch 140 includes a single pole double throw (SPDT) switch. When transmission power needs to be high (above a threshold value), power amplifier 136 is activated to provide transmission from patch antenna 128. Otherwise, patch antenna 126 is employed.

In one illustrative example of the present invention, a mobile phone is employed for device 100, and more particularly a code division multiple access (CDMA) phone. A CDMA phone may have a transmission power control range of about 80 dB. This, in turn, gives about a 50 dB range of operation with power amplifier 136 in an OFF state, because power amplifier 136, in this example, has about 30 dB of gain. Branch 122 with power amplifier 136 and patch antenna 128 operates at high output signal levels only, for example, from −4 to +26 dBm. The other branch 121 with patch antenna 126 is always ON and correspondingly operates from −54 to −4 dBm. When device 100 is operated at maximum or within about 30 dB below a maximum transmit output, both branches 121 and 122 are engaged.

By providing a dual patch antenna system as described with reference to FIG. 3, power savings are realized for portable communication devices. By shutting down amplifier 136 during periods of low power transmissions, the present invention enables significant power savings. For example, talk time can be increased by up to about 40% or more. This reduces battery power consumption and permits longer operation of battery driven devices thereby extending battery life and providing for a reduction in the number of battery recharges.

Figure 4:
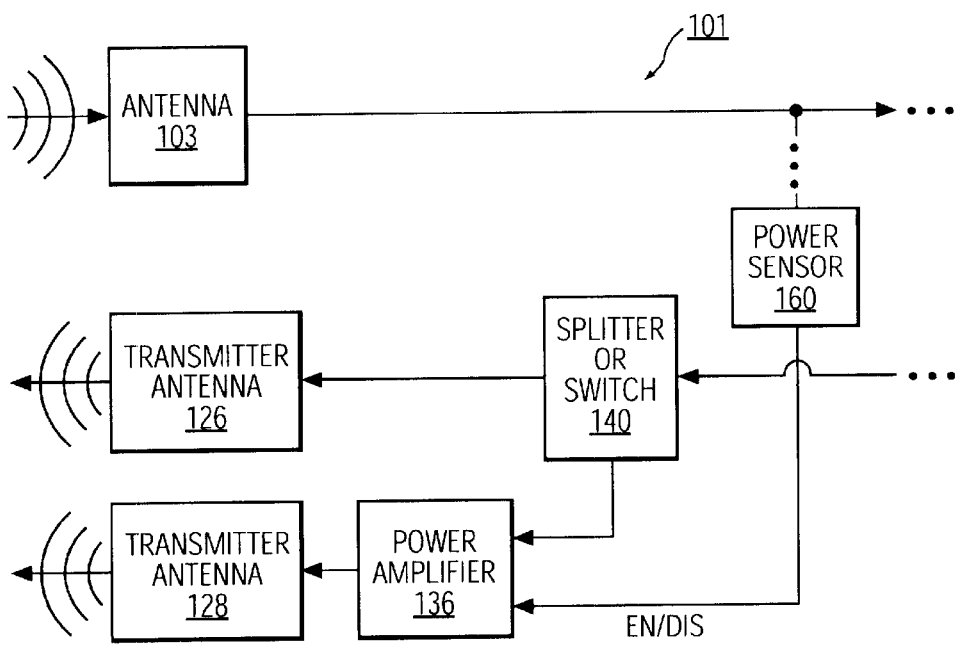
FIG. 4 is a block diagram of a front end architecture of an embodiment of the communication device having two transmission patch antennas and a power sensor for turning a power amplifier on and off in accordance with the present invention.

Referring to FIG. 4, a block diagram of one embodiment of the present invention is shown. Power amplifier 136 may be switched on and off according to received signal power. When a signal is received by an antenna 103, which can be, for example, a patch antenna or an embedded antenna, a power sensor 160 is employed to determine the power of the signal. If the power of the signal is below a predetermined value, for example, 0 to −4 dBm, power sensor 160 outputs an enable signal EN to power amplifier 136. The enable signal turns power amplifier 136 ON to provide high power transmission through antenna 128. Otherwise, power amplifier 136 is disabled (DIS) and transmission is performed through antenna 126. Power sensor 160 may be a dedicated unit or be provided with device 101, such as for example, a mobile phone. Other ways of controlling power amplifier 136 may also be employed. For example, power amplifier 136 may be manually switched on and off by a user or a program device. In still other embodiments, it is contemplated that the gain of amplifier may be adjusted using feedback or a control signal in addition to the capability of being switched on and off.

Figure 5:
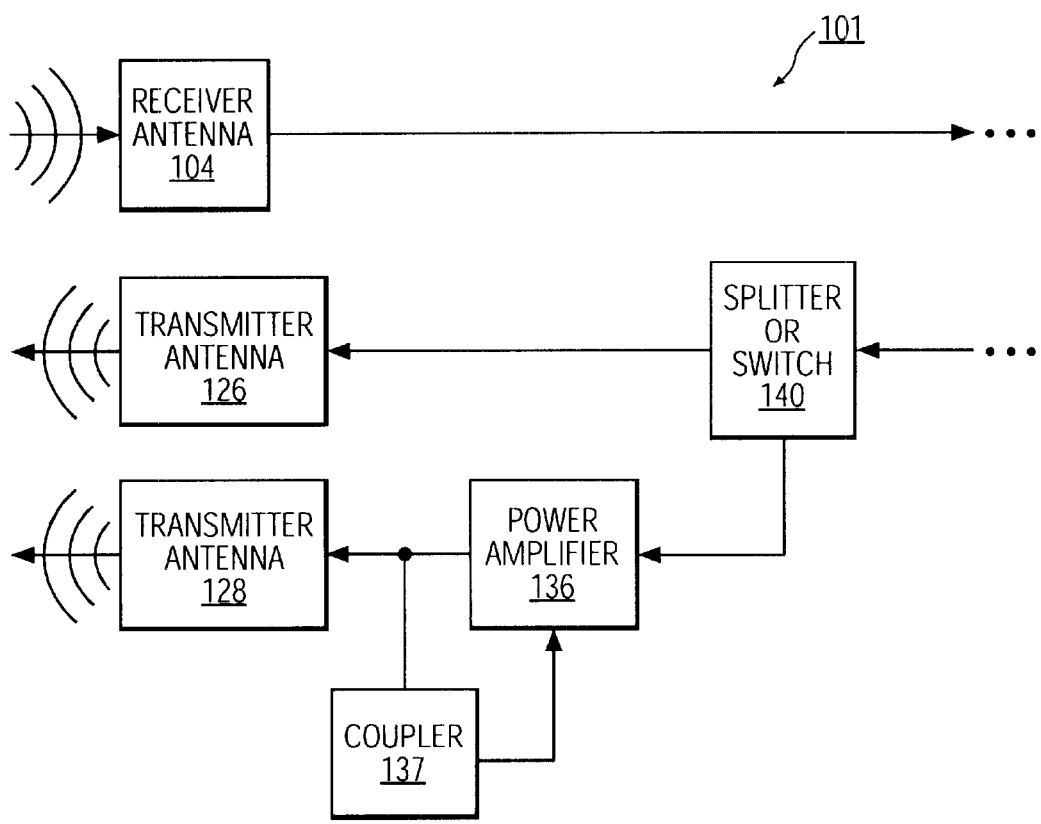
FIG. 5 is a block diagram of a front end architecture of an embodiment of the communication device having two transmission patch antennas and a coupler for turning a power amplifier on and off in accordance with the present invention.

Referring to FIG. 5, a block diagram of another embodiment of the present invention is shown. Power amplifier 136 may be switched on and off according to received signal power. Signals are received by receiver antenna 104, which can be, for example, a patch antenna or an embedded antenna. A coupler 137 is employed to switch power amplifier 137 off, if the power of the signal is below a predetermined value, for example, 0 to −4 dBm. Otherwise, coupler 137 turns power amplifier 136 ON to provide high power transmission through antenna 128. Otherwise, power amplifier 136 is disabled and transmission is performed through antenna 126. Transmission power is determined based on the power of the signals received. Coupler 137 senses the power level of the signals to be transmitted and turns amplifier 136 on or off accordingly. It is also contemplated that the gain of amplifier may be adjusted using feedback or a control signal in addition to the capability of being switched on and off.

Figure 6:
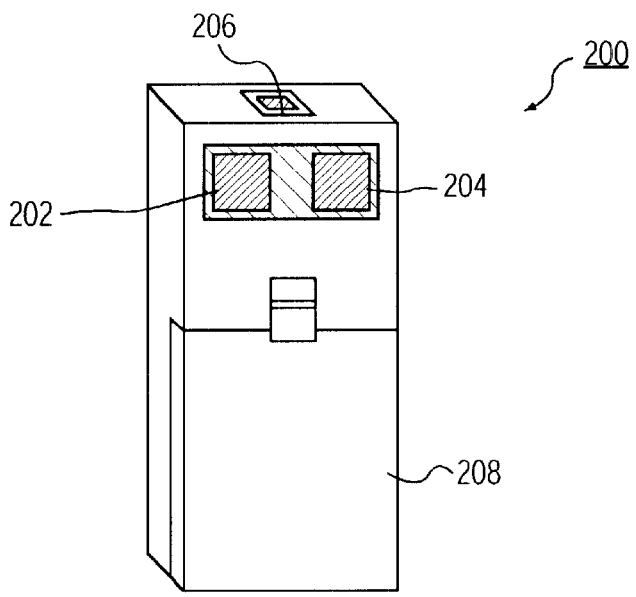
FIG. 6 is a perspective view of a mobile phone with two transmission patch antennas in accordance with one embodiment of the present invention.

Referring to FIG. 6, an illustrative perspective view of a transceiver device 200 in accordance with the present invention. Transceiver 200, such as a mobile phone, is provided in accordance with the invention having two or more transmit patch antennas 202 and 204. The first transmit patch antenna 202 is always ON to transmit low-level signals, for example, from −54 to −4 dBm. A power amplifier (see FIG. 3) is connected to the second transmit antenna 204 and may include a gain of about 30 dB. The power amplifier is turned on only to transmit high power signals, for example, from −4 to +26 dBm. A receiver patch antenna 206 is also included. Patch antennas are preferable provided below a plastic sheet or covering. A battery 208 is installed to power device 200.

Having described preferred embodiments for mobile phone with increased transmitter efficiency employing two or more transmit patch antennas (which are intended to be illustrative and not limiting), it is noted that modifications and variations can be made by persons skilled in the art in light of the above teachings. For example, the transmission portion of the front end may include multiple antennas split into a plurality of ranges for transmitting RF signals. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A portable communication device having a transmission portion on a front end of said portable communication device, comprising:

a first transmission antenna coupled to a first output of a branching device for transmitting signals having a power below a threshold value;

a power amplifier coupled to a second output of the branching device, the power amplifier for providing amplification to signals to be transmitted; and a second transmission antenna connected to an output of the power amplifier such that the power amplifier is switched off for transmission signals having a power below the threshold value and switched on to amplify transmission signals above the threshold value.

2. The portable communication device as recited in claim 1, wherein the first and second antennas are patch antennas.

3. The portable communication device as recited in claim 1, wherein the branching device includes a switch.

4. The portable communication device as recited in claim 1, wherein the branching device includes a splitter.

5. The portable communication device as recited in claim 1, wherein the communication device includes a mobile phone.

6. The portable communication device as recited in claim 5, wherein the mobile phone is a code division multiple access phone having a transmission power range of about 80 decibels.

7. The portable communication device as recited in claim 6, wherein the power amplifier provides a gain of 30 decibels and the threshold value is about 30 decibels below a largest transmission value of the transmission power range.

8. The portable communication device as recited in claim 1, wherein the power amplifier provides a gain G and the threshold value is less than a largest transmission value of the transmission power range minus G.

9. The portable communication device as recited in claim 1, further comprising a power sensor adapted for sensing a power level of received signals and outputting an enable signal to switch the power amplifier on when the sensed power is below a value.

10. The portable communication device as recited in claim 9, wherein the power sensor disables the power amplifier when the sensed power is above the value.

11. The portable communication device as recited in claim 1, further comprising a coupler adapted for sensing a power level at an output of the power amplifier and switching the power amplifier off when the sensed power is below a value.

12. The portable communication device as recited in claim 11, wherein the coupler enables the power amplifier when the sensed power is above the value.

13. A portable communication device having a front end comprising:

a transmission portion including
a first transmission antenna coupled to a first output of a branching device for transmitting signals having a power below a threshold value,
a power amplifier coupled to a second output of the branching device, the power amplifier for providing amplification to signals to be transmitted, and
a second transmission antenna connected to an output of the power amplifier such that the power amplifier is switched off for transmission signals having a power below the threshold value and switched on to amplify transmission signals above the threshold value;

a receiver portion including a receiver antenna coupled to a receive mixer for receiving signals for the front end; and a local oscillator for providing signals to down convert the received signals and up convert the transmission signals for the front end.

14. The portable communication device as recited in claim 13, wherein the first and second transmission antennas are patch antennas.

15. The portable communication device as recited in claim 13, wherein the branching device includes a switch.

16. The portable communication device as recited in claim 13, wherein the branching device includes a splitter.

17. The portable communication device as recited in claim 13, wherein the portable communication device includes a mobile phone.

18. The portable communication device as recited in claim 17, wherein the mobile phone is a code division multiple access phone having a transmission power range of about 80 decibels.

19. The portable communication device as recited in claim 18, wherein the power amplifier provides a gain of 30 decibels and the threshold value is about 30 decibels below a largest transmission value of the transmission power range.

20. The portable communication device as recited in claim 13, wherein the power amplifier provides a gain G and the threshold value is less than a largest transmission value of the transmission power range minus G.

21. The portable communication device as recited in claim 13, further comprising a power sensor adapted for sensing a power level of received signals and outputting an enable signal to switch the power amplifier on when the sensed power is below a value.

22. The portable communication device as recited in claim 21, wherein the power sensor disables the power amplifier when the sensed power is above the value.

23. The portable communication device as recited in claim 13, further comprising a coupler adapted for sensing a power level at an output of the power amplifier and switching the power amplifier off when the sensed power is below a value.

24. The portable communication device as recited in claim 23, wherein the coupler enables the power amplifier when the sensed power is above the value.

* * * * *